United States Patent [19]

Lakso et al.

[11] Patent Number: 5,302,970
[45] Date of Patent: Apr. 12, 1994

[54] PERSONAL COMMUNICATION DEVICE

[75] Inventors: Susan L. Lakso, Springfield, Mass.; Michael A. Ceppetelli, Broad Brook, Conn.; David M. Kroll, Wilbraham; Richard D. Rose, Springfield, both of Mass.

[73] Assignee: Abovo, Inc., Springfield, Mass.

[21] Appl. No.: 901,973

[22] Filed: Jun. 22, 1992

[51] Int. Cl.$^5$ .............................................. G09G 3/02
[52] U.S. Cl. .................................... 345/168; 341/21; 341/22
[58] Field of Search ................... 341/22, 21; 340/711; 200/5 R; 400/681; 252/299.1

[56] References Cited

U.S. PATENT DOCUMENTS

| Re. 32,365 | 3/1987 | Sebestyen | 340/711 |
|---|---|---|---|
| Re. 33,229 | 6/1990 | Schwaber | 340/711 |
| 3,884,342 | 5/1975 | Mulholland | 400/681 |
| 3,925,779 | 12/1975 | Gerstenhaber | 340/825.19 |
| 4,075,621 | 2/1978 | Salmon | 340/825.19 |
| 4,293,855 | 10/1981 | Perkins | 340/712 |
| 4,322,587 | 3/1982 | Burns | 200/5 R |
| 4,430,639 | 2/1984 | Bennett | 340/310 A |
| 5,007,008 | 4/1991 | Beers | 341/22 |
| 5,106,529 | 4/1992 | Ichimura | 252/299.01 |
| 5,144,302 | 9/1992 | Carter | 341/22 |

Primary Examiner—Richard Hjerpe
Assistant Examiner—Minsun Oh
Attorney, Agent, or Firm—Richard H. Kosakowski

[57] ABSTRACT

A personal communicating device comprising both a base unit and a remote unit. The base unit is comprised of an alpha-numeric keyboard with recessed keys, a cradle, a super-twist screen, a printer, and an infrared transmitter. The remote unit is comprised of an infrared receiver and a display screen. A user types information on the base unit which is displayed on the base unit's screen. The same information is simultaneously transmitted and displayed by infrared transmission link to the remote unit and displayed on the remote unit's screen. The recessed keys make it physically impossible for the user to strike more than one key at a time while typing with one finger. The cradle allows the base unit to be removably attached to a variety of surfaces including the user's arm or an arm of a wheelchair.

23 Claims, 7 Drawing Sheets

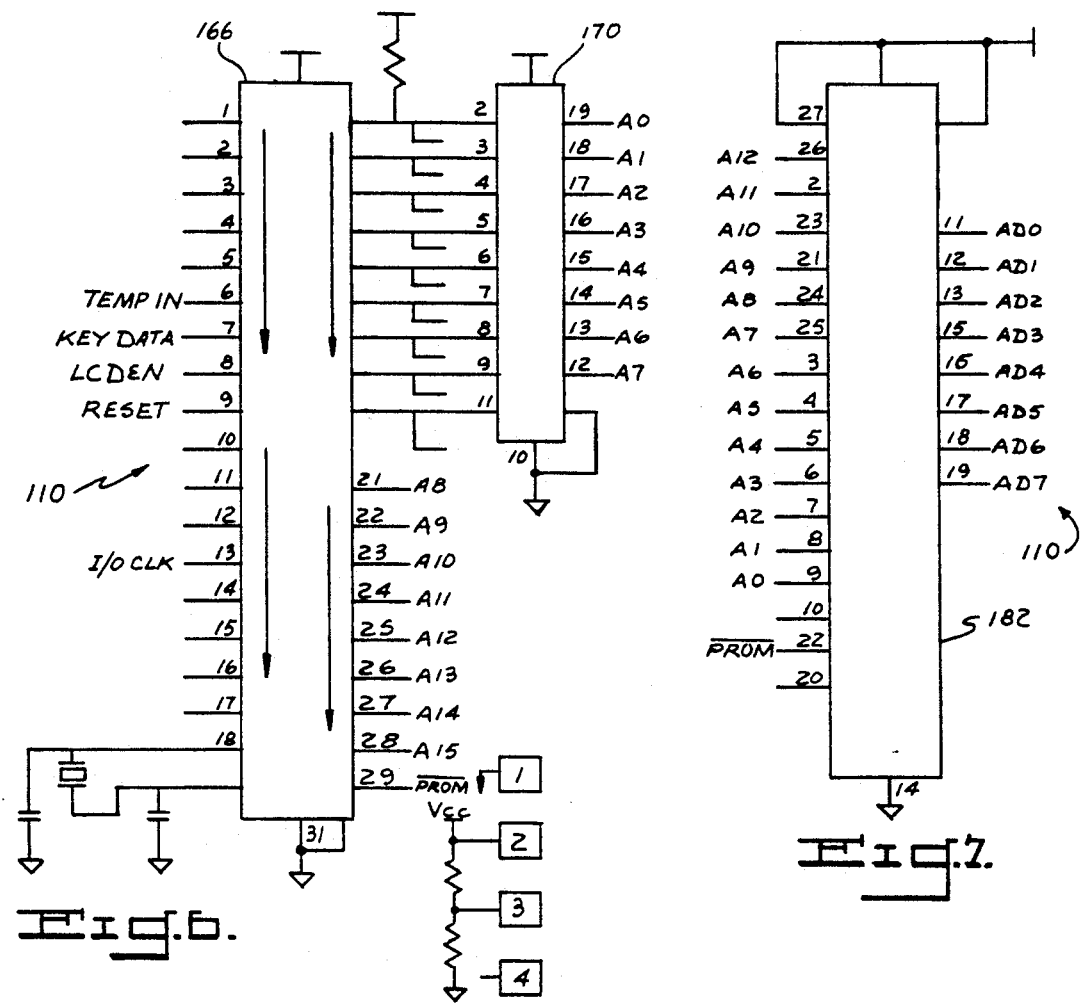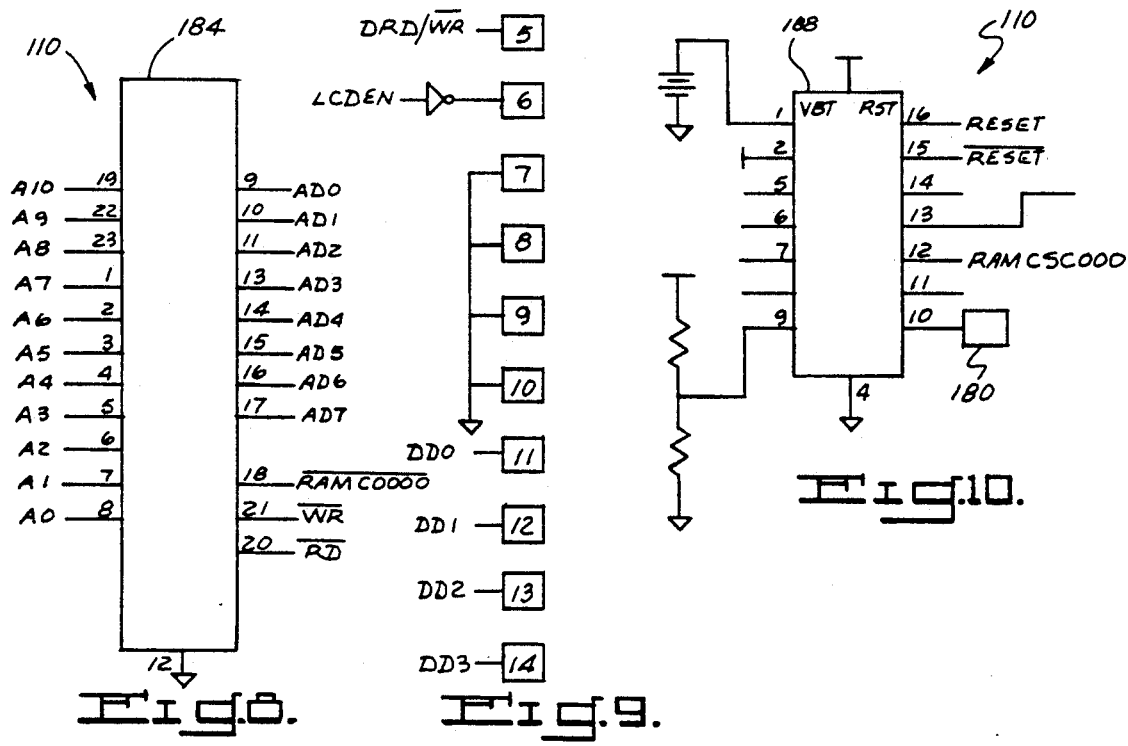

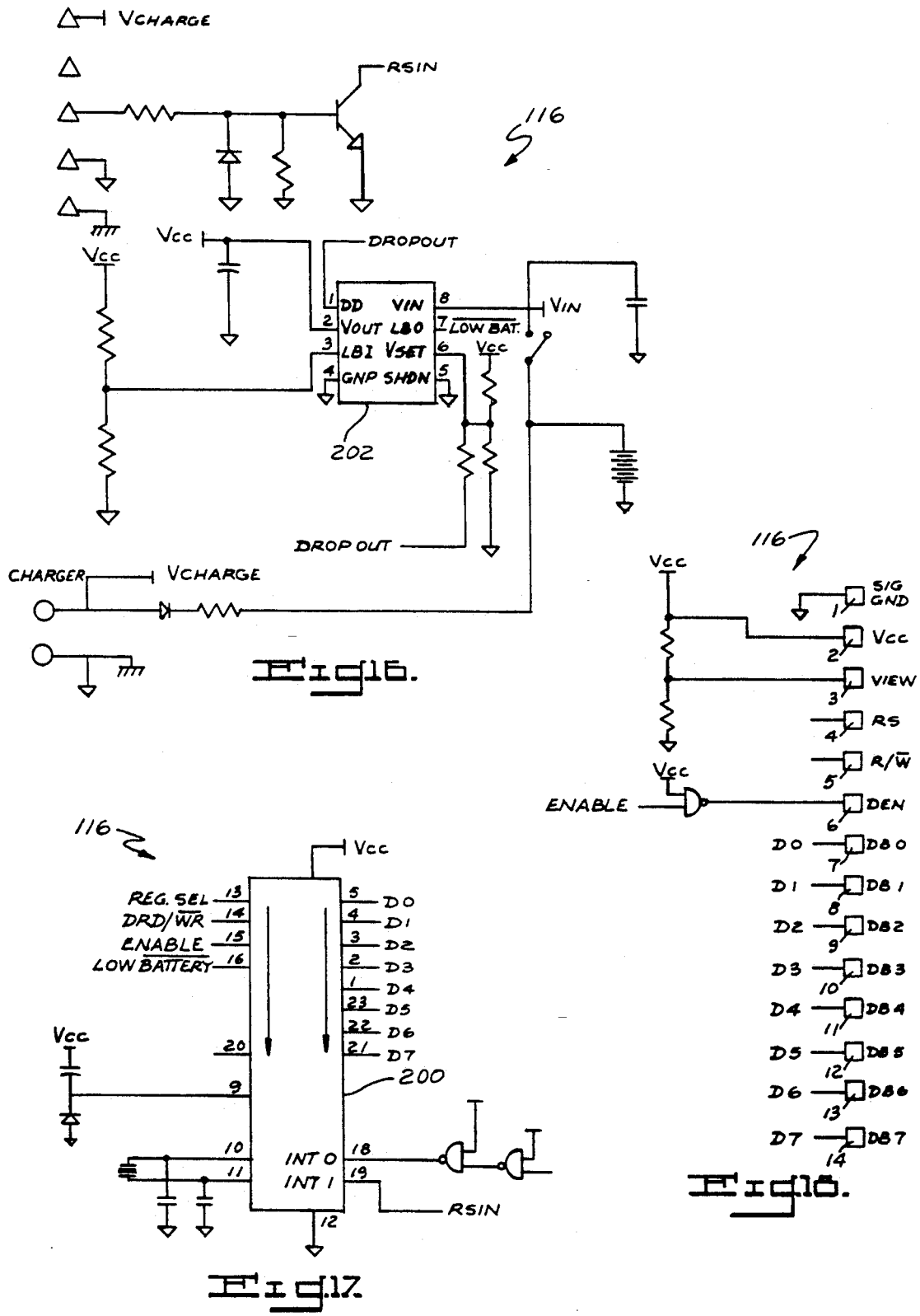

PERSONAL COMMUNICATION DEVICE

BACKGROUND OF THE INVENTION

The present invention relates to hand-held communicating devices, and more particularly to devices with alpha-numeric keyboards and remote display units.

Many people in society suffer from muteness or severe speech impairments. These people include persons who have had this condition from birth (such as persons who have cerebral palsy) and those who have had the condition only for a relatively short time (such as stroke victims).

Numerous solutions have been proposed to help alleviate the burden of this handicap. For example, some persons have learned to communicate with sign language. Its effectiveness, however, is diminished due to the relatively small number of people who know sign language well enough to communicate.

Several devices have been invented and patented that strive to enable persons to communicate without requiring them to learn a second language, such as sign language. Some of these devices attempt to take advantage of modern computer technology. For example, one hand-held communicating device is disclosed in U.S. Pat. No. 4075621 to Salmon. Salmon discloses a device which comprises a housing, a keyboard, and a screen. There is, however, only one screen and it faces the viewer, not the user. Consequently, if the user mistypes, he is unaware of it. In addition, because the screen is located on the device held by the user, the viewer and the user must necessarily be in close proximity to each other. Therefore, if the viewer and the user were across the room from each other, the device would be of little use.

One invention which does allow the user and the viewer to be at a distance from each other and still communicate is disclosed in U.S. Pat. No. RE 33229 to Schwaber. Schwaber discloses an optically linked calculator system for displaying data generated by a local calculator. The data is displayed at both the local calculator, a remote calculator, and a detached display unit. This device, however, is limited to entry of numerical data. It does not allow persons to type alpha-numeric data. Thus, the device is ineffective to allow a person to communicate his or her most basic needs.

Although Salmon and Schwaber have made advances in the area of personal communication devices, there are many drawbacks associated with these inventions. For example, both of the above-mentioned patents have keyboards with elevated keys. Oftentimes, a person who has suffered a stroke has unsteady hands. This shaking interferes with that person's ability to accurately push the keys. Unfortunately, their hand mis-strikes due to the shaking and hits the wrong key, or it hits extra, unintended keys. This can be very aggravating, and frustrating both to the user and the viewer.

There is also another drawback to the two referenced patents. Both of them require its user to hold the device with one hand and type with the other. If possible, the user could set the devices on a flat surface. Unfortunately, not all users are physically capable of holding the device for a variety of reasons. For example, some stroke patients are commonly paralyzed on one or both sides of their bodies. Other users, although not paralyzed, may lack the physical stamina necessary to hold the device for long periods of time. Again, others may shake uncontrollably such that holding a device would be futile. Even if the device could be operated from a flat surface, flat surfaces which are at a comfortable level are not always available.

Finally, many f these devices require the user and a viewer to view the display screens from one particular angle. Unfortunately, this predetermined angle set by the manufacturer is sometimes unworkable for the user. Manufacturers often set the viewing angle for someone who has a proper posture. Some persons who have had a stroke or who suffer from paralysis are slumped over and do not have a proper posture. Consequently, they are unable to view the screen or they must strain themselves to view it.

Accordingly, it is the primary object of the present invention to provide an improved personal communicating device which overcomes the deficiencies of the prior art.

It is another object to provide a communicating device which does not use elevated keys on its keyboard.

It is still another object to allow the user to use the device without requiring the user to hold the device or be adjacent to a flat surface upon which to rest the device.

It is yet another object to provide a screen that can be viewed from multiple angles, regardless of the user's or viewer's posture or position.

The above and other objects and advantages of this invention will become more readily apparent when the following description is read in conjunction with the accompanying drawings.

SUMMARY OF THE INVENTION

A personal communicating device is disclosed. In its preferred embodiment, the invention basically comprises: a base unit with a detachable cradle which allows the user to strap the base unit to his or her arm; recessed keys on the base unit which allow a user to enter data; a base unit screen for displaying the typed data; and circuitry for simultaneously transmitting and displaying the data onto a remote unit.

The base unit includes a keyboard with forty-one alpha-numeric keys in a plurality of rows; a forty character single-line liquid-crystal display (L.C.D.) above the keyboard; and an electronic subassembly. In addition, the base unit's keys are recessed, such that if the user touches the edge of the key, the design of the concave wall around the key will propel the user's finger toward the key, not away from it. Because of the concavity of each wall surrounding each key, it is physically impossible to strike more than one key at a time while typing with one finger. Further, the base unit's LCD display screen is a "super-twist" type screen which allows the user to view the screen from a plurality of angles.

The base unit's electronic subassembly displays the data typed by the user. This data is then simultaneously transmitted and displayed at the remote unit. The remote unit is detached, lightweight, and portable. The base unit can electronically communicate with the remote unit from as far away as twenty feet.

Figure 11:
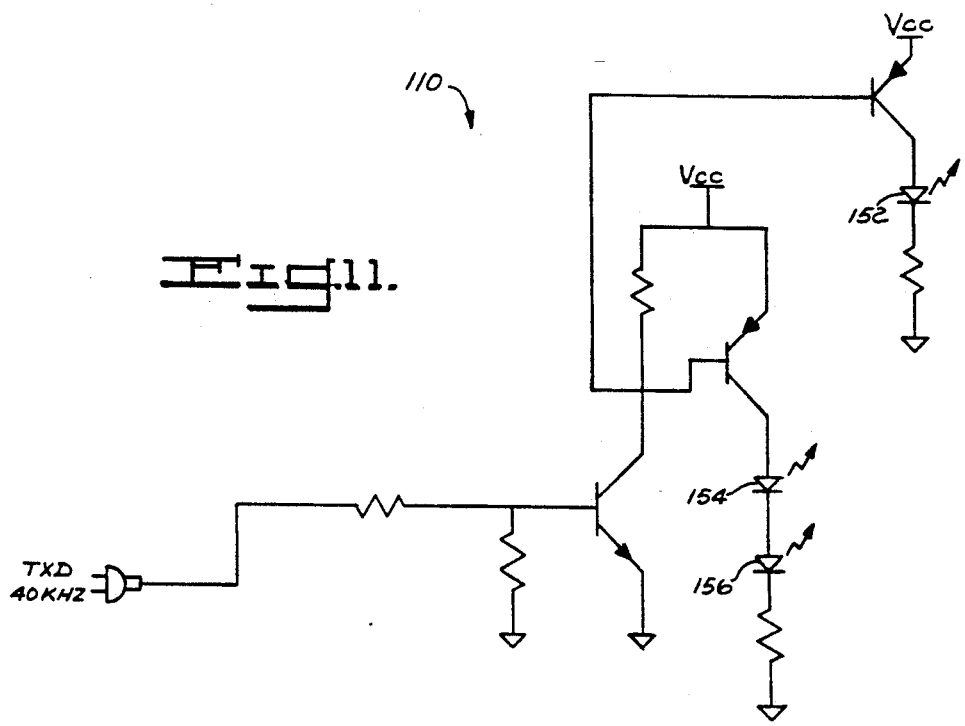
Figure 12:
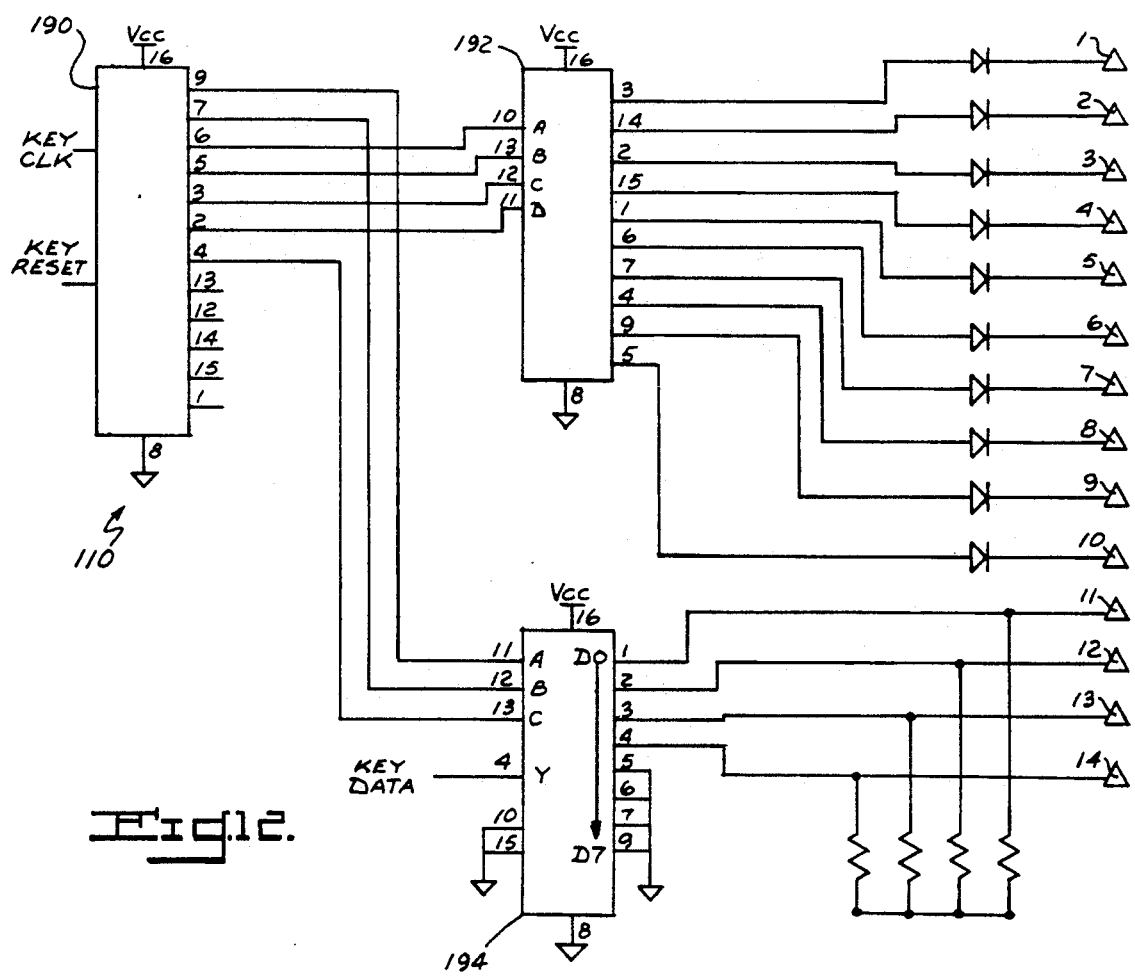
Figure 13:
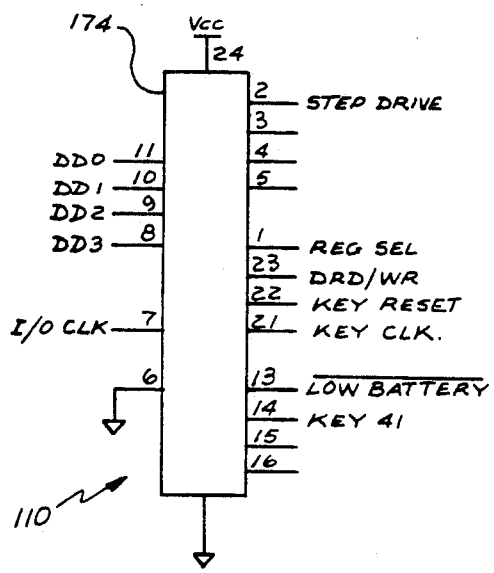
Figure 14:
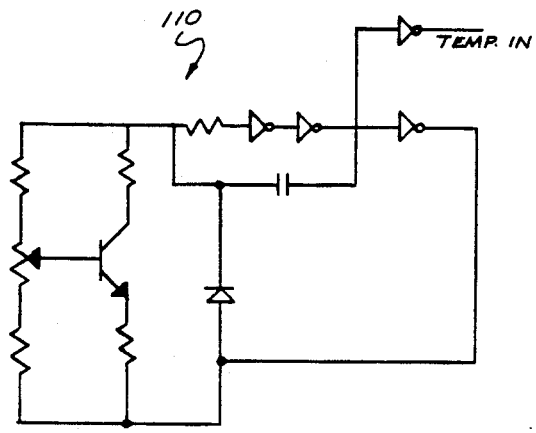
Figure 15:
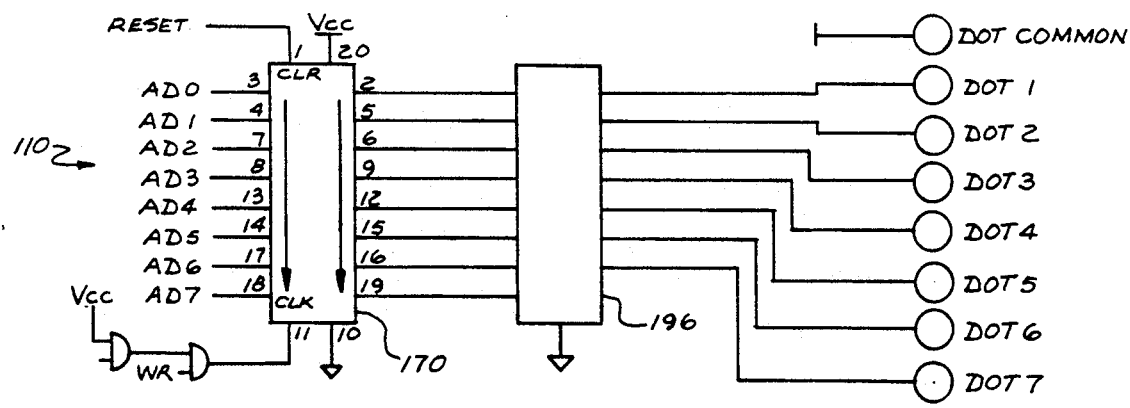

The following figures are schematics of the base unit keyboard display:

FIG. 6 is a schematic diagram of the base unit's microcontroller and tri-state latch;

FIG. 7 is a schematic diagram of an EPROM;

FIG. 8 is a schematic diagram of a RAM;

FIG. 9 is a schematic diagram of an interconnect to a liquid-crystal display;

FIG. 10 is a schematic diagram of a supervisory circuit;

FIG. 11 is a schematic diagram of some infrared emitting devices;

FIG. 12 is a schematic of a keyboard scanning circuit;

The following figures are schematics for a base unit's printer:

FIG. 13 is a schematic of a port expander;

FIG. 14 is a schematic of a temperature compensated oscillator;

FIG. 15 is a thermal printhead driver and printer interconnect;

The following figures are schematics of a remote unit display:

FIG. 16 is a schematic of a voltage regulator;

FIG. 17 is a schematic of a microcontroller; and

FIG. 18 is a schematic diagram of a remote unit's liquid-crystal display.

DETAILED DESCRIPTION OF THE PREFERRED EMBODIMENT

Figure 1:
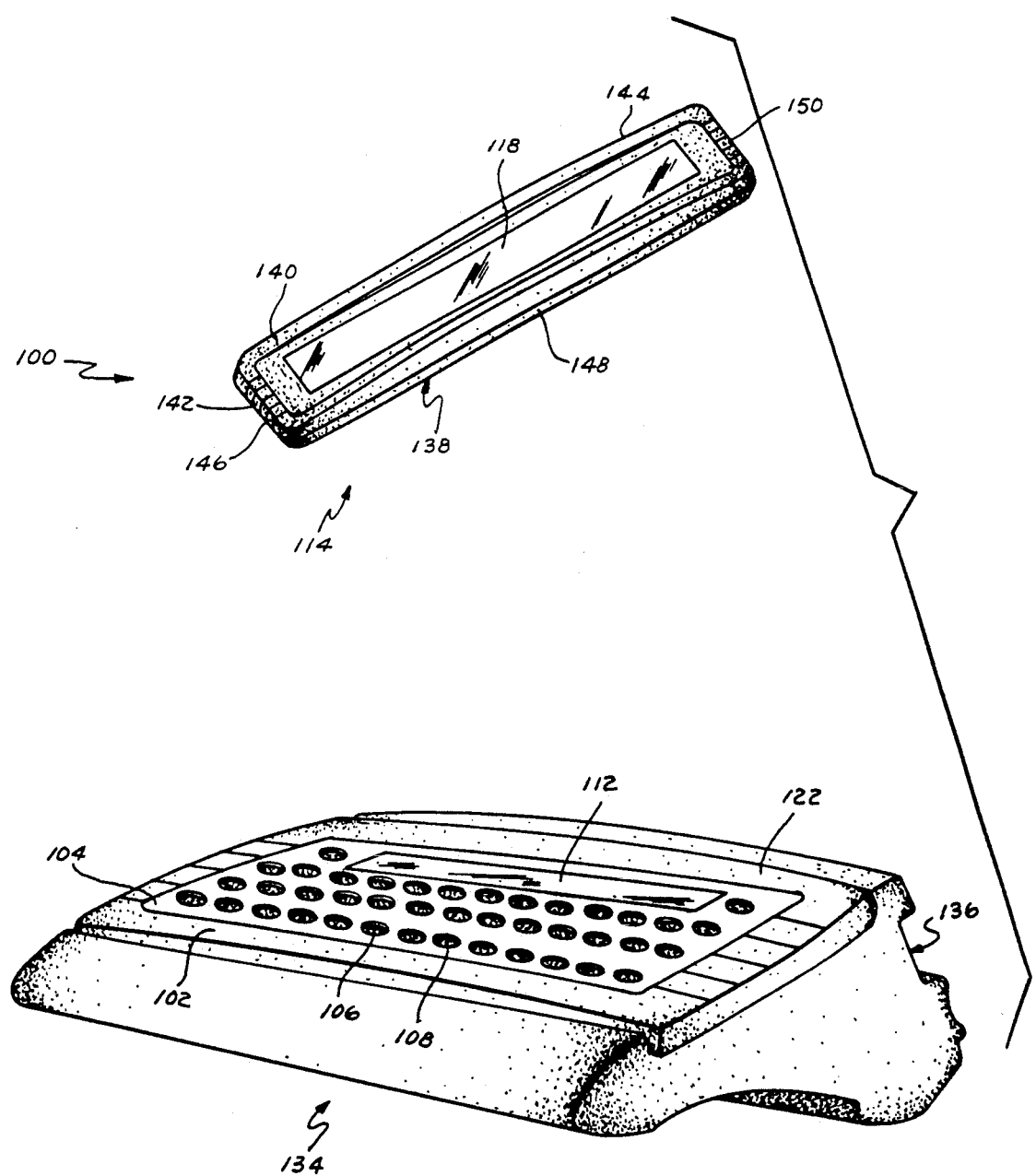
FIG. 1 is a perspective view of a base unit of a personal communicating device in its detachable cradle and a remote unit constructed in accordance with the present invention.

Referring to the drawings in detail, the preferred embodiment of a personal communicating device is shown and generally designated by the reference numeral 100. It is manufactured and marketed under the trademark ABOVO ™, by ABOVO ™, Inc., of Springfield, Mass. In its preferred embodiment, as shown in FIG. 1, the invention basically comprises: a base unit 102, which has a keyboard 104 with recessed keys, such as 106, 108, which allows its user to enter data; base unit circuitry 110 which displays the typed data on a base unit screen 112 and which transmits the typed data to a remote unit 114; and remote unit circuitry 116 for receiving the data and simultaneously displaying it on a remote unit screen 118.

The invention has been given reference numerals which begin with 100. This has been done to eliminate any confusion between the inventive elements and the pin numbers, which are designated with single or double digits.

Figure 2:
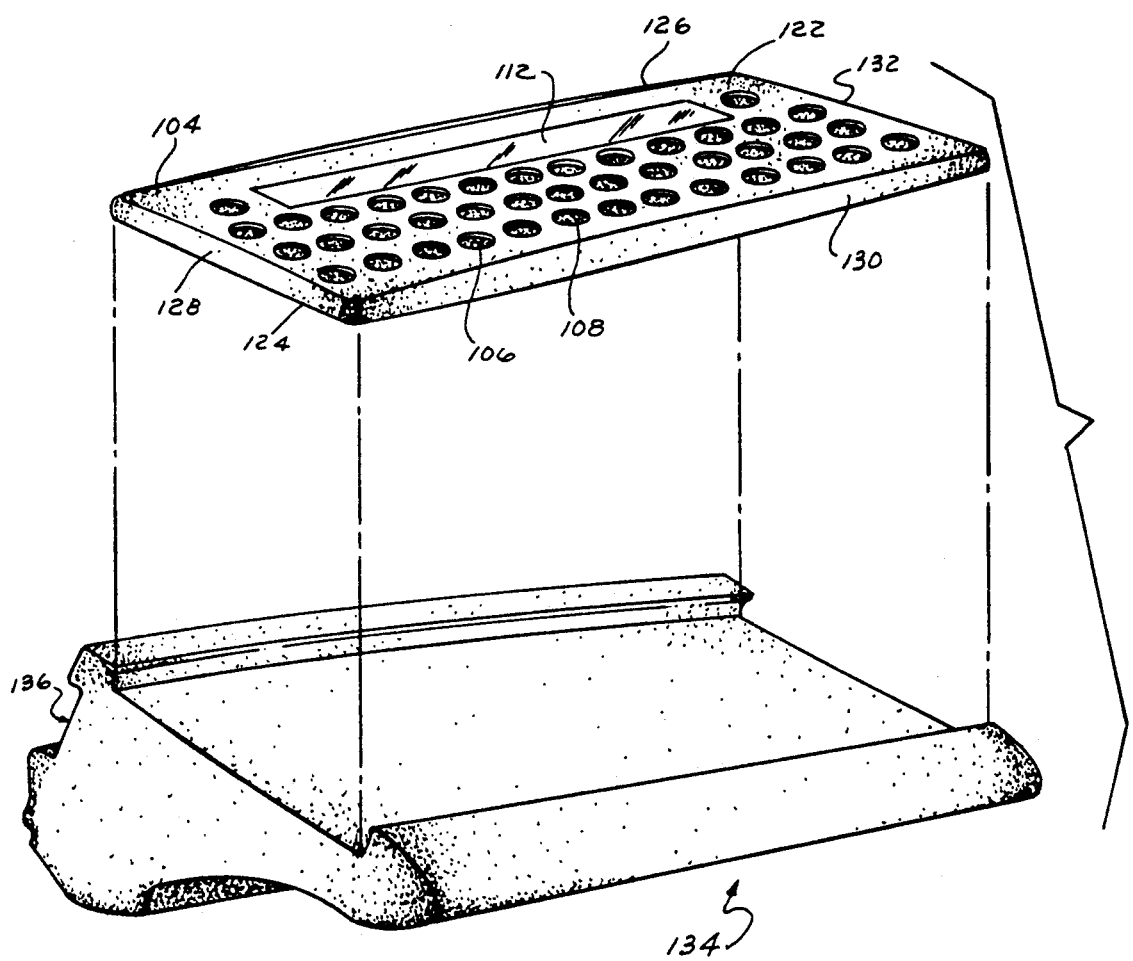
FIG. 2 is an exploded view of the base unit and its detachable cradle.

In the illustrated embodiment shown in FIG. 2, the base unit 102 comprises a housing 120 with a top 122, bottom 124, and four sides 126, 128, 130, 132, which are integrally attached at substantially right angles. The housing 120 can be made of any suitable light-weight plastic, such as ABS resin made by Uniroyal Plastics Company, of Mishawaka, Ind. In the preferred embodiment, the housing 120 is a "clam shell" design. The housing 120 is thermoformed of ABS resin with a wall thickness of 0.070 inch. The housing 120 is fastened together, from the bottom 124, with four screws (not shown) threaded into standoffs (not shown) in the top-half of the enclosure. The housing 120 is designed such that it fits comfortably in a user's hand. In the preferred embodiment, the unit 102 is approximately seven inches in length, three inches in width, and two inches in height.

The housing 120 contains molded details which accommodate the keyboard 104 via one-half inch diameter countersinks. This keyboard 104, in its preferred embodiment, contains forty-one keys, such as 106, 108, in a series of rows. The keyboard 104 contains all the letters of the alphabet, as well as the numbers zero through nine. The keyboard 104 also contains a question mark, a delete key, a period, an equal sign, cursor movement keys for scrolling left and right, and a shift key (not shown). Mathematical symbols and the operations of addition, substraction, multiplication, and division (not shown) are also provided. Each key, such as 106, 108, is 0.380 inch in diameter in a one-half inch diameter countersink. An integrally attached keypad (not shown) is made of any suitable material, such as silicone rubber, fitted with a conductive graphite/carbon material that enables the keys, such as 106, 108, to directly connect the traces on a board (not shown) below.

The housing 120 also contains a forty character, single line liquid crystal display (L.C.D.) screen 112, which is positioned at the top of the unit 102 at substantially its center, shown in FIGS. 1, 2. The screen 112 can be any suitable screen. In the preferred embodiment, the screen 112 is a "super-twist" screen which allows viewing from multiple angles. While any suitable screen may be used, this screen is one manufactured and marketed by Samsung Information Systems America, Inc., located in San Jose, Calif., Model No. 1*40 UC-401001-SNHTO-E.

The base unit 102 can stand alone, or it can be attached to a cradle 134, as shown in FIGS. 1, 2. This cradle 134 can be made of any suitable material, such as foam. The foam cradle 134 is designed such that it may be attached comfortably and securely to a user's arm, or it can even be attached to other surfaces, such as the arm of a wheelchair (not shown). The user may, alternatively, rest the base unit 102 on a flat surface, such as a table, with the base unit 102 either in or out of the cradle 134. If the base unit 102 is in the cradle 134, the cradle 134 positions the base unit 102 on a small slope, which facilitates typing and viewing of the screen 112.

The cradle 134 also has a small storage area 136 in the rear panel 126, shown in FIG. 1. The user may insert the remote 114 into the slot 136 for storage when the remote 114 is not needed.

The base unit 102 may also come equipped with a keyboard wedge (not shown). This wedge is an interface device, which can operate by either infrared or direct connect, which links the base unit to a computer (not shown). With the wedge, the information a user types can be downloaded into a computer and stored for later use, in a manner well known in the art. The wedge is approximately three inches by five inches in size. The wedge can be made of any suitable material such as aluminum.

The base unit 102 also has an attached printer (not shown), located in the rear panel 126 of the base unit 102. When enabled, the printer can optionally print in forty character blocks, character by character, or it can print all matter stored in the PCD. The printer makes a thermal print of the characters visible on the base unit's L.C.D. screen 112. Any suitable paper can be used, such as three-eighths inch paper.

Figure 3:
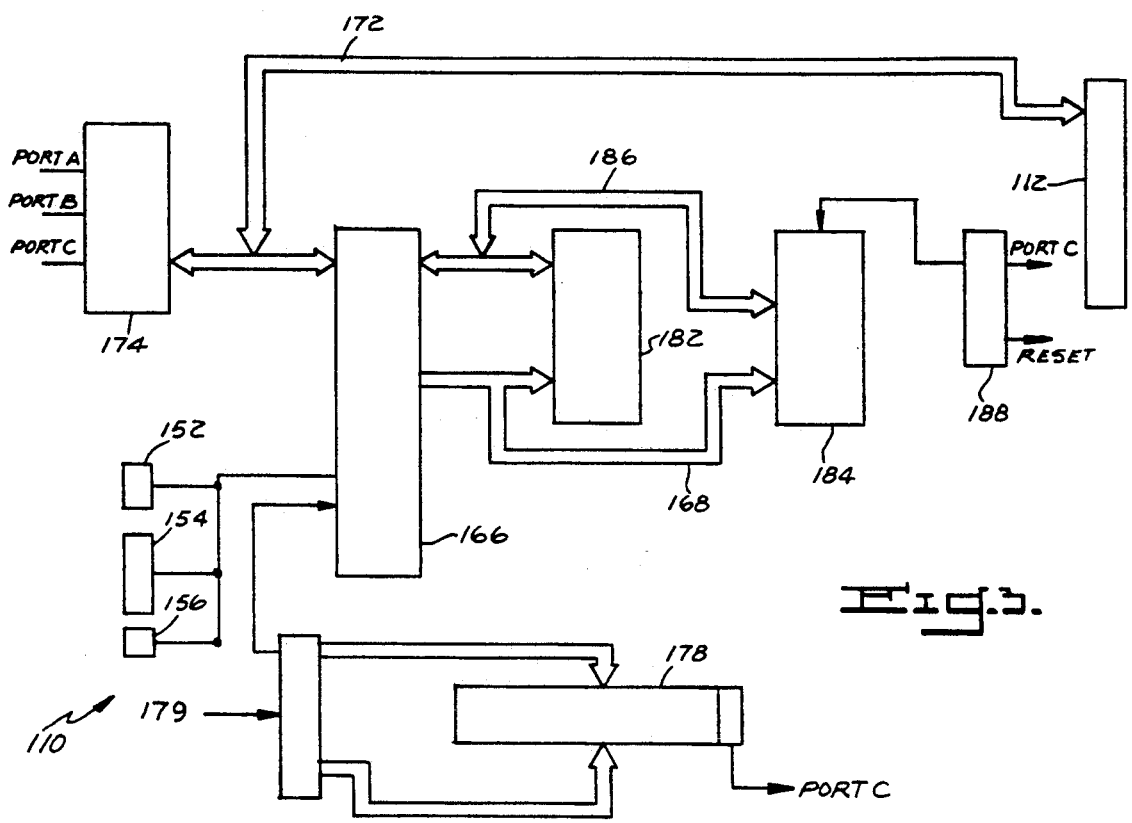
FIG. 3 is a block diagram of the base unit circuitry.
Figures 4, 5:
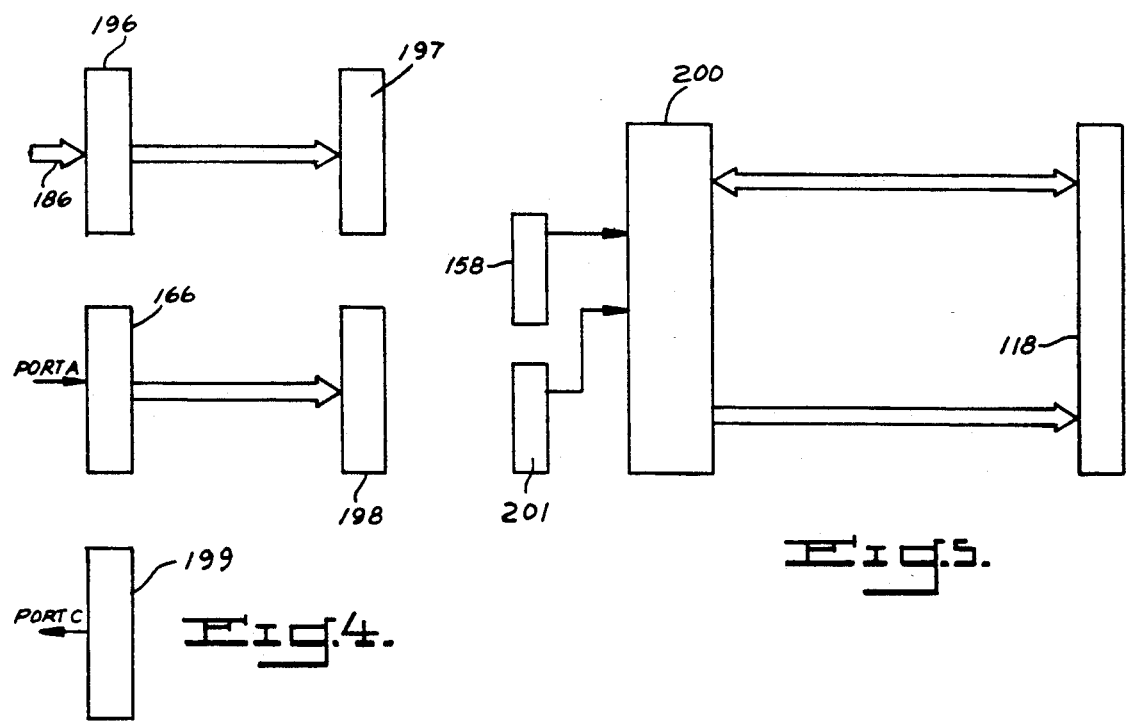
FIG. 4 is another block diagram of the base unit circuitry.
FIG. 5 is a block diagram of the remote unit circuitry.

The base unit 102 connects to the remote unit 114 by any suitable means, such as infrared transmission link, shown in FIGS. 3, 5.

The remote unit 114 has a housing 138 which is made of any suitable material. In the preferred embodiment, the remote's housing 138 is thermoformed of ABS resin with a wall thickness of 0.070 inches. The remote's housing 138 is fastened together with four screws (not shown) threaded into standoffs (not shown) near the top of the enclosure. See FIG. 1.

The remote's housing 138 contains a top panel 140, a bottom panel 142, and four side panels 144, 146, 148, 150, which are integrally attached at substantially right angles. A single line liquid crystal display (L.C.D.) screen 118 resides in the center of the remote's top panel 140. This screen 118, like the one on the base unit 112, is also a super-twist screen, which allows viewing from multiple angles. Any suitable display screen may be used, such as the one made by Samsung Information Systems America, Inc., located in San Jose, Calif., Model No. 1*40 UC-401001-SNHTO-E.

BASE UNIT CIRCUITRY

The base unit circuitry 110 basically converts the data (which has been manually entered on the keyboard 104) into a digital format. This circuitry 110 then takes the digital data and converts it into a human readable form and then displays it onto the base unit's super-twist screen 112. Then, the digital data is sent, by infrared transmission link, also referred to as an optical link to the remote unit 114. See FIGS. 6-12.

As shown in FIGS. 3, 5, the infrared transmission link, or optical link, of the base unit 102 is made of three infrared L.E.D.s (also referred to as I.R.E.D.s) 152, 154, 156, such as those manufactured and marketed by Marktech International Corporation, of Latham, N.Y., Model No. MTE 1100, and their associated transistors (not shown), such as those also manufactured and marketed by Samsung Information Systems America, Inc., of San Jose, Calif., Model No. MPSA55. These I.R.E.D.s 152, 154, 156 are active only during entry of the data. When the I.R.E.D.s 152, 154, 156 are activated, data is transmitted in a standard serial ASCII format and modulated at forty kilohertz.

The optical link includes an optical transmitter of the base unit 102 and an optical receiver, or infrared detector demodulator, 158 of the remote unit 114. The infrared transmitter transmits in the infrared spectrum and includes at least a single infrared emitting device, such as 152. Each infrared emitting diode (I.R.E.D.), such as 152, is fabricated in any suitable manner such as a P-N junction from gallium arsenide (GaAs) or aluminum gallium arsenide (AlGaAs) or alternating layers of GaAs and AlGaAs. Infrared radiation occurs in a manner that is well known in the art. For example, when forward biased (positive lead connected to P-type and negative lead connected to N-type material) charge-carrier recombination occurs. Electrons cross from the N side to recombine with holes on the P side of the junction. Because electrons are at a higher energy level than the holes, phonons (heat energy) and photons (light energy) are emitted. The output wavelength depends on the bandgap of the material. The peak GaAs energy is at about 900 nanometers (nm) and the peak AlGaAs energy is at about 830 nm. One suitable infrared transmission receiving circuit was disclosed in U.S. Pat. No. RE 33229; that patent is hereby incorporated by reference.

This base unit circuitry 110 transmits up to distances of twenty feet. A beam (not shown) from an infrared transmitter, such as 152, is shaped like a cone, wherein the infrared emitting device is located at the apex of the cone, as is well known in the art. More than one infrared emitting device can be used to increase the effective diameter of the cone. So long as the infrared receiver 158 of the remote unit 114 is within the cone of reception and sensitive enough to detect the emitted radiation, the remote unit 114 can detect and receive the infrared signal. To increase the cone of reception, one must increase the power input and increase the number of infrared emitting devices. Applicants currently incorporate three infrared emitting devices 152, 154, 156 into the base unit 102.

A voltage supplier (not shown) provides the base unit 102 with its necessary current. Any suitable voltage supplier will suffice, such as the MAX667 voltage regulator by Maxim Technologies. When the input voltage drops below 4.8 volts, a shut down signal is sent by any suitable voltage comparator (not shown), such as the one manufactured by Seiko Instruments U.S.A., Inc., of Santa Clara, Calif., Model No. S80740AH. A combination on/off calculator mode switch (not shown) provides a means to power down the base unit 102 and select the calculator mode functions. An input charging jack (not shown) is diode isolated and current limited by a diode (not shown), specifically a IN4002 diode, manufactured and marketed by General Instruments Corporation, of El Paso, Tex., and a series 22 ohm resistor (not shown). A battery provides an average operating time of eight hours. Any suitable battery can be used, such as a nicad battery pack, or nicad battery, manufactured and marketed by Sony Corporation of America, of Park Ridge, N.J., Model No. BP3.

As shown in FIGS. 3, 6, 7, 8, a microcontroller 166 provides high order addressing for external EPROM and RAM on port 2 (reference pins 21-28, address A8-A15). This microcontroller is marketed and manufactured by Phillips Components-Signetics, of Sunnyvale, Calif., Model No. SCN80C31HCCN40, an eight-bit microcontroller. Low order address and multiplexed data bus 168 signals are generated out of port 0 (reference pins 39-32, address/data 0 through 7). Latched address signals 0 through 7 are output on pins 19 through 12 of an Octal D-type tri-state latch 170, as shown in FIG. 6. This Octal D-type tri-state latch is manufactured and marketed by the National Semiconductor Corporation of Santa Clara, Calif., Model No. MM74HC573N. Pin 31 of the microcontroller 166 provides the latch strobe for the octal address. The microcontroller 166 runs off an 11.0592 megahertz crystal to facilitate common baud rate generation (nominally 1200 baud). A four bit input/output bus 172 is generated off port 1, pins 1-4. This bus 172 is used to interface to the L.C.D. 112 in the four-bit mode and an expansion port 174, shown in FIG. 13. This expansion port 174 is one manufactured and marketed by OKI Telecom, a division of OKI America, Inc., of Norcross, Ga., Model No. MSM82C43RS. Memory and input/output read/write strobes are generated on pins 17 and 16, respectively, of the microcontroller. Serial infrared data is generated by an on-board UART and output on pin 11 of the microcontroller 166, shown in FIG. 6. Keyboard data is input from the keyboard scanning circuit on pin 7. Approximately a thirty millisecond keyboard scan is generated by a timer (not shown) and input on pin 12 of the microcontroller 166. This timer is one manufactured and marketed by Maxim Technologies, Inc., of Santa Clara, Calif., Model No. 1CM75551PA. This timer generates an interrupt signal which is used to remove the microcontroller 166 from its lower power idle mode so that it will periodically scan the keyboard matrix 178. The keyboard matrix 178 is in electronic communication with a keyboard driver 179. After the keyboard scanning is complete, the microcontroller 166 will poll the expansion port 174 for input signals, such as low battery 180 and paper out.

As shown in FIG. 7, the base unit 102 is run by an EPROM 182, such as the one manufactured and marketed by National Semiconductor Corporation mentioned above, Model No. HN27C256AG-15. A logic low level on an output pin (pin 22) and chip enable (pin 20) will put the addressed eight-bit EPROM byte on the data bus for processor execution.

A RAM 184 is a 2 k by 8 or an 8 k by 8 static memory device that is addressed at 0C000 hex, shown in FIG. 8. Read and write signals from the microcontroller 166 (RAM reference pins 21 and 20) indicate bus data 186 being stored or retrieved from RAM 184. Battery backup to the RAM 184 (which provides non-volatile operation) is supplied via pin 24 of the RAM 184. The RAM power switch over from system power (five volts) to battery power (typically three volts) is handled by a supervisory circuit 188 (FIG. 10). One such supervisory circuit is manufactured and marketed by Maxim Technologies, Model No. MAX693EPE.

Both an active high reset for the microcontroller 166 (reference pin 9 microcontroller) and active low reset (supervisory circuit reference pin 16) used for input-/output are also generated by the supervisory circuit 188. A low battery indicator (supervisory circuit reference pin 10) is generated and input to the port expander 174 (expander reference pin 13) to indicate a low battery condition, shown in FIG. 10. This condition will be displayed on the L.C.D. 112. Other inputs on the port expander include: a paper out (reference pin 15), mode select (reference pin 16) to indicate calculator operation, and special keyboard key 41 (reference pin 14) for multi-key operations. Other output signals from the port expander 174 include an optional key beep signal (reference pin 5), display register select and read/write outputs (reference pins 1 and 23), and keyboard scanning signals (reference pins 22 and 21). A motor control signal will also be generated from that expansion port. Port expansion inputs and outputs are presented to/-from the microcontroller on the four-bit input/output data bus (reference pins 11-8). Bus data is clocked into the port expander 174 on the rising edge of the input-/output clock input (reference pin 7).

As shown in FIG. 12, a twelve-stage binary counter 190, such as the CD4040BCN twelve-stage binary counter manufactured by National Semiconductor Corporation, a BCD to decimal decoder 192, such as the CD4028BCN, manufactured by National Semiconductor Corporation, and an eight channel data selector 194, such as the CD4512BCN, also made by National Semiconductor Corporation, scan a 4×10 key matrix. Scanning is achieved by simultaneously selecting one of the ten rows, and one of the four columns, and reading the corresponding data (reference pin 14 of the channel data selector 194). While any suitable channel selector can be used, this channel selector is manufactured and marketed by National Semiconductor, mentioned above. Ten diodes isolate the column outputs (reference pins 3, 14, 2, 15, 1, 6, 7, 4, 9, 5 of the BCD to decimal decoder 192 from inadvertent shorting due to multi-key closures. A new row is selected every ten column scans by the binary counter 190 (reference pins 9, 7 and 4). A new column is scanned with every key clock (reference pin 10). Key reset (reference pin 11) restarts the scanning sequence after the complete matrix has been scanned. Four 39 k pull down resistors (reference inputs of the channel data selector 194) are provided to ensure that row data is defaulted to a low level when a key closure is not sensed.

An NPN transistor (not shown), like the one manufactured and marketed by Phillips Electronic Instruments, of Norcross, Ga., Model No. MPSA13PN, provides a drive signal for the optional key beep signal output from the port expander 174 (reference pin 5).

A pass transistor (not shown) provides higher current capabilities to supply the needed current for the printer.

Drive signals for each dot of the thermal print head dots are provided by any suitable driver 196, such as the UNL2004 Darlington Driver, manufactured and marketed by Phillips Electronics Instruments mentioned above. The printhead driver 196 is in electronic communication with a thermal printhead 197. See FIGS. 4, 15. Dot information is latched from the system data bus into the Octal D-type tri-state latch 170 when an input-/output write is sent to address 8000 hex (latch reference pin 11). The driver 196 buffers the latch outputs and provides the needed current drive for each thermal element. Dot print duration is determined by counting either twenty or sixteen transitions of a thermally compensated oscillator generated by an oscillator circuit FIG. 14 (reference SK3122 NPN transistor and SK31000/519 diode). This oscillator circuit is made up of several components some of which are manufactured and marketed by Toshiba America, Inc., of Irvine, Calif., such as the TC40690.

A stepper motor 198 feeds the thermal paper past the printhead and is controlled by a unipolar stepper motor translator, such as the one manufactured by Allegro Microsystems, Inc., of Worcester, Mass., Model No. UCN5804B. See FIG. 4. The motor 198 advances a full step with each clock pulse (reference pin 11) if pin 100 is at a logic low. The motor 198 advances a half step with each clock pulse if pin 10 is at a logic high. The output motor drivers are enabled when pin 15 is at a logic low. Each of the five dots is positioned by a predetermined number of full or partial steps of the stepper motor 198. Also shown in FIG. 4 is a printer status device 199.

REMOTE UNIT CIRCUITRY

In general, the remote unit's circuitry 116 basically has a local processing means for receiving data transmitted from the base unit 102 and electronic means coupled to the local processing means for converting the data received from the base unit 102 into human readable form and displaying it onto a remote unit screen 118. See FIGS. 5, 16–18.

In particular, modulated text information (not shown) is sent from the base unit 102 and is received by the remote unit 114 by an infrared detector 158. The infrared detector 158 collects infrared signals emanating from the infrared transmitters 152, 154, 156 of the base unit 102 and converts them to electrical signals representing the originally transmitted data bits, in a manner that is well known in the art. Any suitable infrared detector will suffice, such as the one manufactured and marketed by Sharp Electronics Corporation, of Mahwah, N.J., Model No. GP1U52X. The modulated text is in the form of ASCII data and provides an interrupt to a single chip microcontroller 200, which is internally processed and stored. Any suitable microcontroller can be used, such as the one made by Phillips Components-Signetics, mentioned above, Model No. 87C751. The microcontroller 200 converts and presents the serial data to a liquid-crystal display (L.C.D.) 118. The microcontroller 200 is also in electronic communication with a signal conditioner 201.

The display information is presented in an eight-bit (D0–D7) format (microcontroller reference pins 5, 4, 3, 2, 1, 23, 22, 21) to the display combined with appropriate register select read/write and display enable signals.

As shown in FIG. 17, the remote's microcontroller 200 runs at an external frequency of 11.0592 megahertz to easily facilitate serial reception of standard baud rates (nominally 2400 baud). The microcontroller 200 also monitors a low battery signal from a voltage regulator 202, like the Maxim Technologies' MAX667 voltage regulator, to determine if battery voltage is at an appropriate level. See FIG. 16. A low battery message will appear on the L.C.D. 118 if a low battery condition occurs.

The voltage regulator 202, shown in FIG. 16, supplies the system Vcc of five volts. The voltage regulator 202 is configured in a manner in which it will shut itself down when a battery input voltage falls below a usable level (approximately 4.8 volts). If the voltage drops too low, a shutdown occurs by feeding a dropout (reference pin 1) indicator signal back into the voltage set input (reference pin 6). Pin 3 is the low battery input monitor point and pin 7 provides the low battery indication to the microcontroller 200. See FIG. 16

Power on reset is accomplished by the RC time constant generated by the external forty-seven microfarad capacitor and internal resistor of pin 9 on the microcontroller 200. See FIG. 17.

OPERATION OF THE UNITS

In operation, the user first turns on the base unit 102 by manually flipping an on/off switch (not shown) located on the rear panel 126. This activates the base unit's keyboard 104 and the base unit screen 112 and the thermal printer. Finally, the user may also turn on the remote unit 114 by flipping a switch (not shown) on the rear panel 144 of the remote unit's housing 138. This activates the remote unit's screen 118.

The user may utilize the base unit 102, while it is either in or out of the foam cradle 134. See FIGS. 1, 2. If the base unit 102 is out of the cradle 134, the base unit 102 can rest on any flat surface. If, however, the base unit 102 is housed in its cradle 134, the top panel of the cradle 134 is canted and has a recessed portion (not shown) that is canted such that the base unit 102 is slanted toward the user to facilitate typing. The cradle 134 positions the base unit 102 such that the screen 112 is slightly elevated from the flat surface. Also, when the base unit 102 is housed in the cradle 134, the user may attach the cradle 134 to his or her forearm or to the arm of a wheelchair. With the cradle 134, the user does not have to search for a level surface on which to place the base unit 102. This is important for persons confined to wheelchairs who encounter tables and counter tops which are accessible only to persons who are standing.

After the user turns on the base unit 102, user may begin to type. The keyboard 104 is constructed such that a person typing with one finger can only hit one key, such as 106, 108, at a time. The keys, like 106, are below the top panel 122 housing 120, such that if the person hits the perimeter of the key, the housing 120 will direct the user's finger toward the key, such as 106, 108, as shown in FIG. 1.

The keyboard 104 and its corresponding circuitry 110 are designed such that if a user depresses a key, such as 106, and leaves his or her finger on the key, the character will not be repeated; hence, the user will not have to hit the backspace or delete key (not shown).

As the user types a message, each character is automatically displayed on the base unit screen 112 and simultaneously transmitted to the remote unit 114. If the printer is on, a thermal print of each character is made. If the remote unit 114 is on, the remote unit 114 receives the transmitted data and simultaneously displays it on the remote unit screen 118. See FIGS. 1–5.

The base unit 102 can transmit up to distances of twenty feet. Thus, the user and viewer need not be in the immediate vicinity of each other. Thus, one can envision many applications for this device. A base unit user in the kitchen can communicate with the remote viewer in an adjacent room, so long as each user is in a "line of sight". A patient with a base unit 102 can talk frankly to the doctor with a remote unit 114, without the intrusion of an interpreter. A bank customer with a base unit 102 can speak to a bank teller behind the counter and still maintain confidentiality in banking transactions.

After the message has been typed, the user may optionally utilize a wedge such that the information can be downloaded to a computer. Thus, the user can save his or her messages and print them out at a later date.

After the user and viewer are finished, they must turn off each device. Then, they may optionally store the remote unit 114 in the storage space 136 located on the rear panel 126 of the base unit 102.

Applicants envision other uses as well. The base unit 102 and the remote unit 114 can be made watertight and used by scuba divers and underwater explorers.

Additionally, the units may be modified to accommodate a classroom setting. For example, one base unit 102 could be optically connected to a plurality of remote units 114. If necessary, the invention could be modified to accommodate a direct connect.

Further, Applicants envision that the device can be used to alleviate language barriers. Applicants hope to incorporate an electronic feature whereby the user types in language A, while the base unit circuitry simultaneously translates and transmits the information to the remote unit in language B.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A personal communicating device that facilitates expression of a thought by a user who either cannot speak or who has difficulty in speaking, the device comprising:
   a. a base unit having an attached alpha-numeric keyboard for manually entering character data representative of a thought of the user and having base electronic means for generating corresponding data in a digital data format, said base electronic means including display means coupled thereto for displaying said data in a human readable form, said base electronic means including further optical transmitting means for converting said digital data into atmospherically transmitted pulses of optical radiation;

b. a remote data processing unit comprising optical receiving means for receiving the atmospherically transmitted pulses of optical radiation, and for converting the received pulses into digitally formatted data, wherein said optical receiving means is electronically connected to a local processing means for receiving data transmitted from the base unit, remote electronic means for converting the data received from the base unit into the human readable form is electronically coupled to said local processing means, and local display means for displaying the data from said local processing means; and c. cradle means having a bottom panel that rests on a surface, a top panel that is canted, and four side panels, said top panel being adapted in size and shape to receive the base unit, one of the four side panels being adapted in size and shape to receive and store the remote unit.

2. The personal communicating device of claim 1, wherein the keyboard of the base unit has integrally attached recessed keys, said keys adapted in size and shape such that the user typing with one finger can strike only one key at a time.

3. The personal communicating device of claim 1, wherein the bottom panel of the cradle means has a concave portion.

4. The personal communicating device of claim 1, wherein the data displayed on the display means in the base unit in the human readable form is displayed on an attached liquid crystal display super-twist screen, which allows viewing from multiple angles.

5. The personal communicating device of claim 1, wherein the data displayed on the local display means in the remote unit in the human readable form is displayed on an attached liquid crystal display super-twist screen, which allows viewing from multiple angles.

6. The personal communicating device of claim 1, wherein the keyboard and the base electronic means comprise means for generating a single character datum when the user depresses a single key on the keyboard, regardless of the time that the user depresses the single key.

7. A personal communicating device that facilitates expression of a thought by a user who either cannot speak or has difficulty in speaking, the device comprising:

a. a base unit having an attached alpha-numeric keyboard comprised of recessed keys adapted in size and shape such that the user typing with one finger can strike only one key at a time, said recessed keys being operable for manually entering character data representative of a thought of a user, and having base electronic means for generating corresponding data in a digital data format, said base electronic means including display means coupled thereto for displaying said data in a human readable form, said base electronic means including further optical transmitting means for converting said digital data into atmospherically transmitted pulses of optical radiation;

b. a remote data processing unit comprising optical receiving means for receiving the atmospherically transmitted pulses of optical radiation, and for converting the received pulses into digitally formatted data, wherein said optical receiving means is electronically connected to a local processing means for receiving data transmitted from the base unit, remote electronic means for converting the data received from the base unit into the human readable form is electronically coupled to said local processing means, and local display means for displaying the data from said local processing means; and c. cradle means having a bottom panel that rests on a surface, a top panel that is canted, and four side panels, said top panel being adapted in size and shape to receive the base unit, one of the four side panels being adapted in size and shape to receive and store the remote unit.

8. The personal communicating device of claim 7, wherein the bottom panel of the cradle means has a concave portion.

9. The personal communicating device of claim 7, wherein the data displayed on the display means in the base unit in the human readable form is displayed on an attached screen, which allows viewing from multiple angles.

10. The personal communicating device of claim 7, wherein the data displayed on the local display means in the remote unit in the human readable form is displayed on an attached screen, which allows viewing from multiple angles.

11. The personal communicating device of claim 7, wherein the keyboard and the base electronic means comprise means for generating a single character datum when the user depresses a single key on the keyboard regardless of the time that the user depresses the single key.

12. A personal communicating device that facilitates expression of a thought by a user who either cannot speak or who has difficulty in speaking, the device comprising:

a. a base unit including a cradle means for supporting the base unit on a surface and including an attached alpha-numeric keyboard with integrally attached recessed keys, wherein said recessed keys are adapted in size and shape such that the user typing with one finger can strike only one key at a time, said keys allow for entering character data representative of a thought of the user, the base unit further including base electronic means for generating corresponding data in a digital data format, said base electronic means including display means for displaying said data in a human readable form, said base electronic means including further optical transmitting means for converting said digital data into atmospherically transmitted pulses of optical radiation; and b. a remote data processing unit comprising optical receiving means for receiving the atmospherically transmitted pulses of optical radiation, and for converting the received pulses into digitally formatted data, wherein said optical receiving means is electronically connected to a local processing means for receiving data transmitted from the base unit, remote electronic means electronically coupled to said local processing means for converting the data received from the base unit into the human readable form and displaying the same onto a remote unit screen, the cradle means having a bottom panel that rests on a surface, a top panel that is canted, and four side panels, said top panel being adapted in size and shape to receive the base unit, one of the four side panels being adapted in size and shape to receive and store the remote unit.

13. The personal communicating device of claim 12, wherein the data displayed on the base unit in the human readable form is displayed on an attached screen, which allows viewing from multiple angles.

14. The personal communicating device of claim 12, wherein the data displayed on the remote unit in the human readable form is displayed on an attached screen, which allows viewing from multiple angles.

15. The personal communicating device of claim 12, wherein the keyboard and the base electronic means comprise means for generating a single character datum when the user depresses a single key on the keyboard, regardless of the time that the user depresses the single key.

16. A personal communicating device that facilitates expression of a thought by a user who either cannot speak or who has difficulty in speaking, the device comprising:
 a. a base unit including a cradle means for supporting the base unit on a surface and including an attached alpha-numeric keyboard with integrally attached recessed keys, wherein said recessed keys are adapted in size and shape such that the user typing with one finger can strike only one key at a time, said keys allow for entering character data representative of a thought of the user, the base unit further including base electronic means for generating corresponding data in a digital data format, said base electronic means including display means for displaying said data in a human readable form onto a liquid crystal display super-twist screen which allows viewing from multiple angles, said base electronic means including further including optical transmitting means for converting said digital data into atmospherically transmitted pulses of optical radiation; and
 b. a remote data processing unit comprising optical receiving means for receiving the atmospherically transmitted pulses of optical radiation, and for converting the received pulses into digitally formatted data, wherein said optical receiving means is electronically connected to a local processing means for receiving data transmitted from the base unit, remote electronic means for converting the data received from the base unit into the human readable form is electronically coupled to said local processing means, wherein the data is displayed onto an attached screen which allows viewing from multiple angles, the cradle means having a bottom panel that rests on a surface, a top panel that is canted, and four side panels, said top panel being adapted in size and shape to receive the base unit, one of the four side panels being adapted in size and shape to receive and store the remote unit.

17. The personal communicating device of claim 16, wherein the keyboard and the electronic circuitry comprise means for generating a single character datum when the user depresses a single key on the keyboard, regardless of the time that the user depresses the single key.

18. The personal communicating device of claim 16, wherein the bottom panel of the cradle means has a concave portion.

19. In a personal communicating device that facilitates expression of a thought by a user who either cannot speak or who has difficulty in speaking, the device having a base unit and an optically linked remote unit, wherein the base unit comprises an attached alpha-numeric keyboard for entering character data, representative of a thought of a user, electronic processing means for generating entered data into digitally formatted data, a display means coupled to said electronic processing means for displaying data provided by said processing means, the improvement comprising the base unit with recessed keys, wherein the recessed keys are adapted in size and shape such that a user typing with one finger can strike only one key at a time, and a cradle means having a bottom panel that rests on a surface, a top panel that is canted, and four side panels, said top panel being adapted in size and shape to receive the base unit, one of the four side panels being adapted in size and shape to receive and store the remote unit.

20. The personal communicating device of claim 19, wherein the bottom panel of the cradle means has a concave portion.

21. The personal communicating device of claim 19, wherein the base unit comprises an attached liquid crystal display super-twist screen.

22. The personal communicating device of claim 19, wherein the remote unit comprises an attached liquid crystal display super-twist screen.

23. In a personal communicating device that facilitates expression of a thought by a user who either cannot speak or who has difficulty in speaking, the device having a base unit and an optically linked remote unit, wherein the base unit comprises an attached alpha-numeric keyboard for entering character data representative of a thought of a user, electronic processing means for generating entered data into digitally formatted data, a display means coupled to said electronic processing means for displaying data provided by said processing means, the improvement comprising the base unit which can be removably housed in a cradle means for housing the base unit on a flat surface or removably attaching it to a non-flat surface, the cradle means having a bottom panel that rests on a surface, a top panel that is canted, and four side panels, said top panel being adapted in size and shape to receive the base unit, one of the four side panels being adapted in size and shape to receive and store the remote unit, a keyboard with recessed keys, wherein the recessed keys are adapted in size and shape such that a user typing with only one finger can strike only one key at a time, the base unit and the remote unit both having a liquid crystal display super-twist screen, which allows viewing from multiple angles.

* * * * *